(12) United States Patent  
Schroeder et al.

(10) Patent No.: US 6,299,240 B1  
(45) Date of Patent: Oct. 9, 2001

(54) LIGHTWEIGHT VEHICLE FRAME CONSTRUCTION USING STIFF TORQUE BOXES

(75) Inventors: Del C Schroeder, Bloomfield Hills; David M Langer, Warren; Bryan Logan, Farmington Hills; David G Speth, Sylvan Lake, all of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/574,644

(22) Filed: May 18, 2000

(51) Int. Cl.[7] .......................................................... B60J 7/00
(52) U.S. Cl. ...................... 296/203.01; 296/204; 296/194
(58) Field of Search ..................................... 296/204, 205, 296/202, 193, 194, 195, 197, 29, 30

(56) References Cited

U.S. PATENT DOCUMENTS

| | | | |
|---|---|---|---|
| 3,791,472 | * 2/1974 | Tatsumi | 296/28 |
| 4,673,205 | * 6/1987 | Drewak | 296/194 |
| 4,892,350 | * 1/1990 | Kijima | 296/194 |
| 5,174,628 | * 12/1992 | Hayatsugu et al. | 296/204 |
| 5,320,403 | 6/1994 | Kazyak . | |
| 5,560,674 | * 10/1996 | Tazaki et al. | 296/30 |
| 5,577,797 | * 11/1996 | Takanishi | 296/204 |
| 5,660,428 | * 8/1997 | Catlin | 296/205 |
| 5,685,599 | * 11/1997 | Kitagawa | 296/204 |
| 5,741,026 | 4/1998 | Bonnville . | |
| 5,897,139 | * 4/1999 | Aloe et al. | 296/204 |
| 5,947,519 | 9/1999 | Aloe et al. . | |
| 5,951,097 | * 9/1999 | Esposito et al. | 296/204 |
| 5,992,921 | * 11/1999 | Seki | 296/204 |
| 6,088,918 | * 7/2000 | Corporon et al. | 296/195 |
| 6,099,039 | * 8/2000 | Hine | 296/197 |

* cited by examiner

*Primary Examiner*—Joseph D. Pape  
*Assistant Examiner*—Kiran B. Patel  
(74) *Attorney, Agent, or Firm*—Mark P. Calcaterra

(57) ABSTRACT

A stiff torque box is used with frame rail segments to compose a vehicle frame. The stiff torque box is used to cross-link the left hand and right hand sides of a vehicle frame and is made up of an extruded aluminum skeleton which forms a number of internal cavities, as well as connecting tabs. The connecting tabs are used to fix the frame rail segments to the stiff torque box. Implementing stiff torque boxes in vehicle frame construction allows for more rigid vehicle frames with the advantage of additional weight savings. This construction is ideal for aluminum frame, front wheel drive and body on frame vehicles. Because of the characteristics of such a vehicle frame, opportunities arise to implement other weight conservative vehicle components.

10 Claims, 3 Drawing Sheets

LIGHTWEIGHT VEHICLE FRAME CONSTRUCTION USING STIFF TORQUE BOXES

FIELD OF THE INVENTION

The present invention relates generally to vehicle frames and more particularly to frame structures which improve cost, weight and stiffness of vehicle frames.

SUMMARY OF THE INVENTION

Motor vehicle frames are the backbone of a vehicle. It is to such frames that all major components are attached. Among many others, these components include the engine, body, and suspension. The vehicle frame however, not only acts as a backbone supporting critical vehicle systems, it is itself a system. Vehicle frames are exposed to vibration and movement throughout vehicle operation and can be designed to improve the overall driving characteristics of the vehicle. For example, a vehicle frame can be tuned to help dampen the motor vibrations and thus generated noises, which passengers may find annoying. Additionally, the stiffness of vehicle frames may need to be increased or decreased depending on the amount of torsional flexion desired for a particular suspension.

Traditional motor vehicle frames are comprised of a series of metal bars or rails which are connected in a ladder shape. Typically, two larger frame rails running along the length of the vehicle. The two larger frame rails are then connected to a series of smaller cross members which run between the two larger frame rails. The frame rails and cross members are then fastened together.

This traditional method of building vehicle frames allows for limited room to modify features such as stiffness and dampening. To enhance the stiffness of a typical ladder shaped frame, larger, thicker frame rails with heavier attachments are required. This adds significant weight and cost to the vehicle frame. To decrease the stiffness, frame rails with thinner walls are required which results in a weaker frame.

It has been an on-going objective of the automotive industry to reduce both cost and weight of motor vehicles. Reducing the weight of a vehicle works to reduce cost for both the manufacturer and the vehicle owner. Lighter weight vehicles and vehicle components result in less expensive shipping and manufacture costs. In turn, lighter weight vehicles decrease energy consumption thus increasing fuel or battery efficiency (in the case of a battery powered vehicle). The result is a reduction in operation cost for vehicle owners. Traditional motor vehicle frames work against this objective. It is therefore desirable to improve the method by which vehicle frames are constructed and adapted to particular vehicle characteristics.

It is an object of the present invention to meet automobile industry needs in improving cost and weight of motor vehicles, while maintaining vehicle performance characteristics. The present invention achieves this by introducing a stiff torque box, integral to the overall vehicle frame, which has improved stiffness and weight characteristics. The stiff torque box is made from extruded aluminum and is formed to have several cavities within. The stiff torque box also maintains formed areas at each corner which have connecting tabs. These tabs are used to connect frame rails to the stiff torque box.

The stiff torque box is used as a cross-link between the right and left hand sides of the vehicle frame. It is positioned such that the internal cavities run horizontal, being parallel to the ground. Looking from the side, the stiff torque box allows the side frame rail segments to be stepped down from a first plane to a second plane, acting as a diagonal link between the two planes.

Initially, using aluminum, as opposed to steel, provides a substantial weight savings. Additionally, the stiff torque box is formed as such to allow the aluminum structure to maintain the required stiffness. If additional stiffness is required, a reinforcement tube can be introduced into the stiff torque box. Also, by introducing a stiff torque box various other stamped components, typically required, would be eliminated.

The stiffness of a frame, so constructed, would allow for an opportunity to use plastic composite vehicle bodies. This is because the frame would be of adequate stiffness such that the body itself would be less relied upon to offer additional stiffness for the overall vehicle. This allows for even more weight savings through the lighter weight plastic composite body.

Further areas of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

Figure 1:
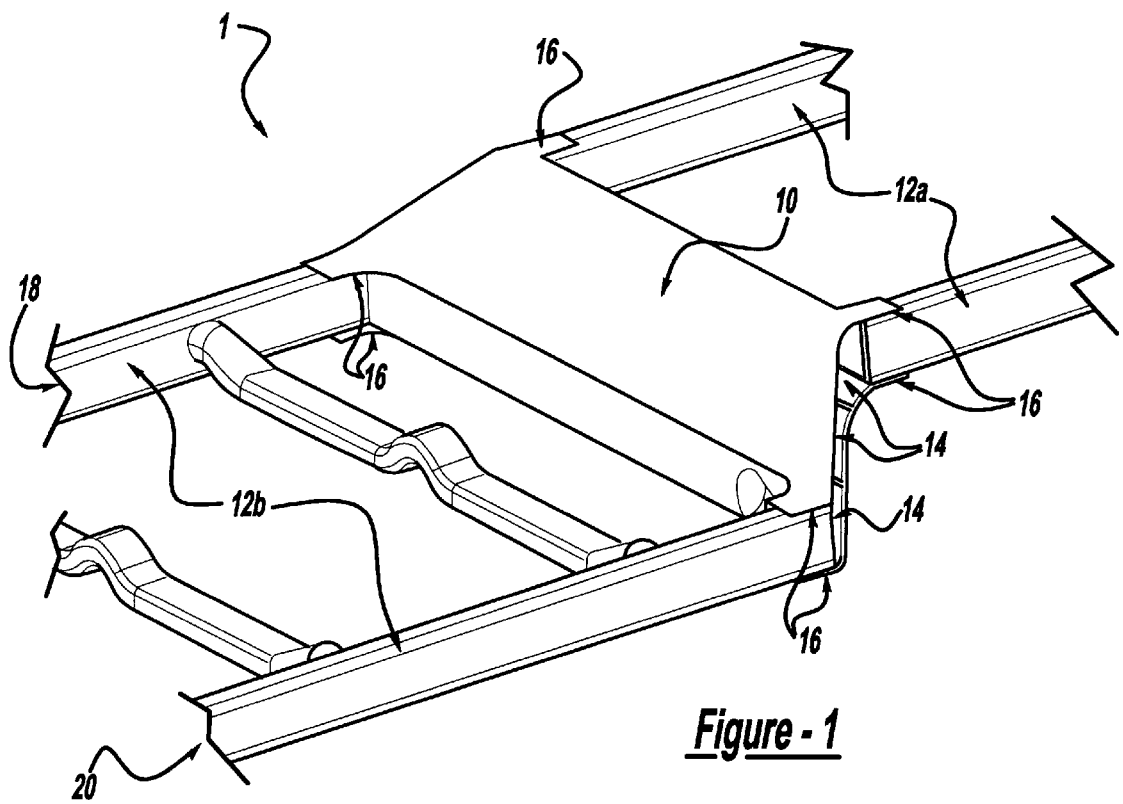
FIG. 1 is a perspective view of a vehicle frame including a rear stiff torque box according to the principles of the present invention.
Figure 2:
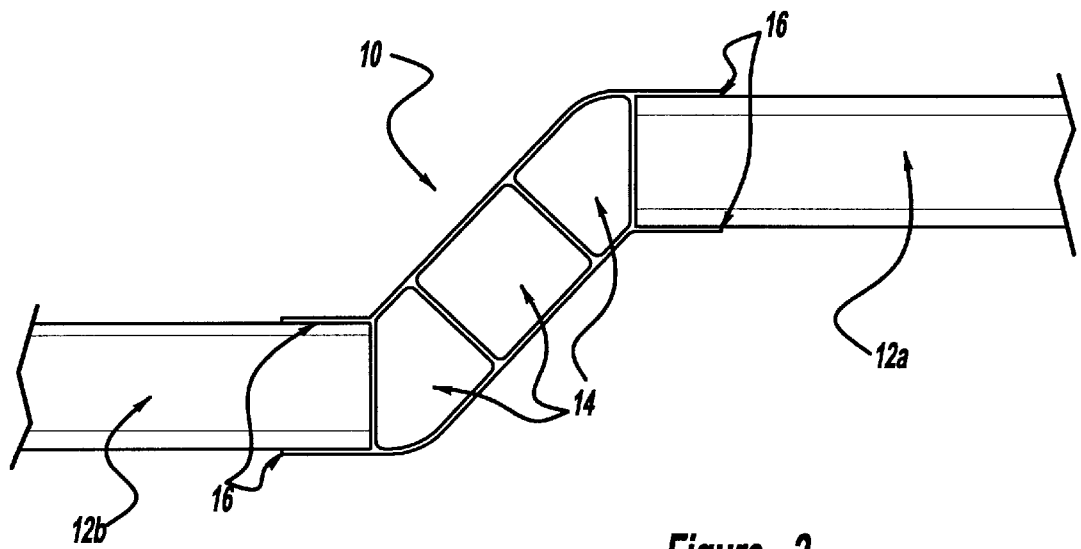
FIG. 2 is a partial side view of a vehicle frame including a rear stiff torque box according to the principles of the present invention.

With reference to FIG. 1, a schematic view of a frame portion 1 is displayed. The frame portion 1 includes a rear stiff torque box 10 and frame rail segments 12a, 12b. The frame rails may be stamped, extruded, or hydroformed of cast aluminum material. (Box or C channel sections.) The stiff torque box 10 is made from extruded aluminum and defines several internal cavities 14, best shown in FIG. 2. The stiff torque box 10 also defines several connecting tabs 16 which are used to connect the frame rail segments 12a, 12b rigidly to the stiff torque box 10. As is shown, the stiff torque box 10 cross-links the right hand side frame 18 and left hand side frame 20. FIG. 2 displays a side view of the above described frame portion 1. The cavities 14 within the stiff torque box 10 are clearly shown. Additionally, the frame rail segments 12a, 12b slide in between the connecting tabs 16 to attach to the stiff torque box 10. As can be seen, the upper, rear frame rail segments 12a run in a first plane generally parallel to a second plane in which the lower, middle frame rail segments 12b run. The stiff torque box 10 serves to diagonally connect the rear and middle frame rails 12a, 12b in their respective planes, as is seen in FIG. 2. Once in position, the frame rails 12a, 12b are connected via welding, bending, or otherwise fastened to the connecting tabs 16 of the torque box 10.

Figure 3:
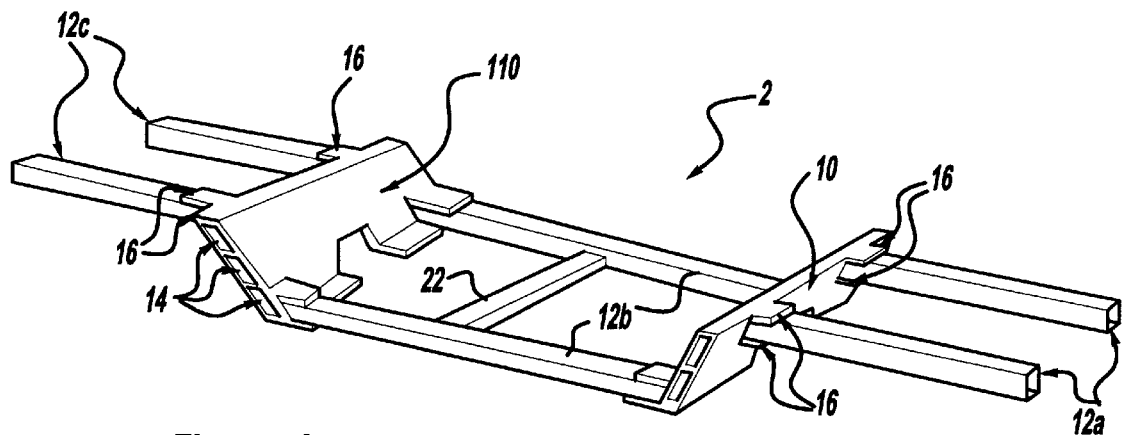
FIG. 3 is a schematic view of a vehicle sub-frame according to the principles of the present invention.
Figure 4:
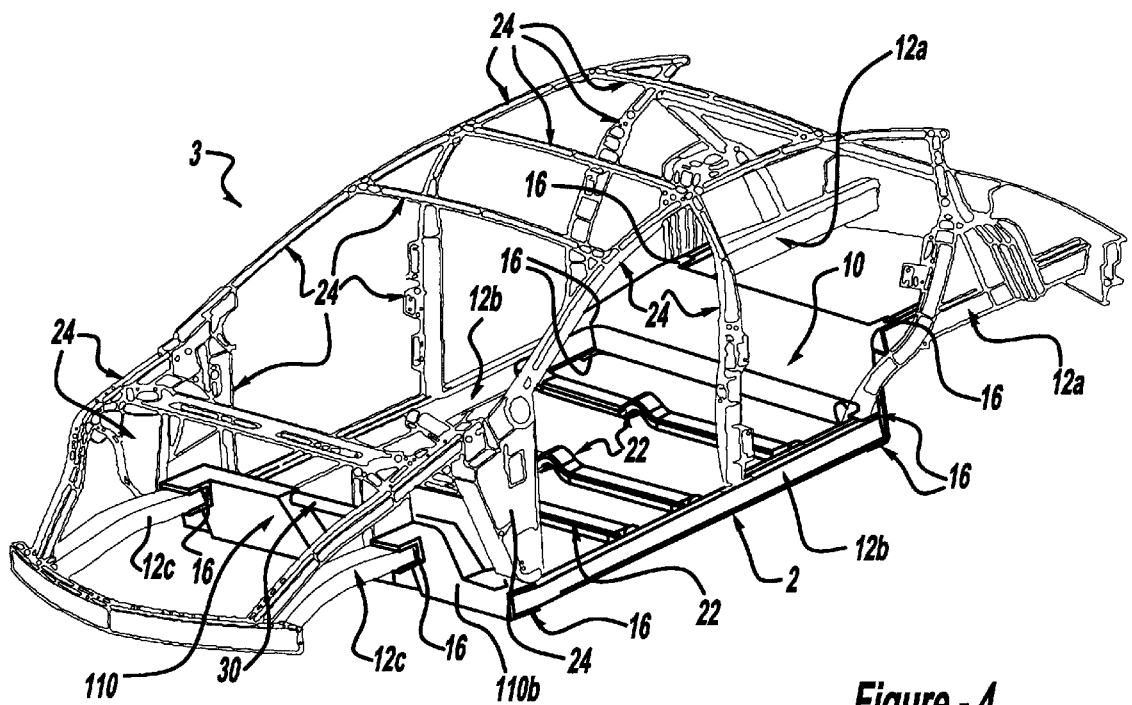
FIG. 4 is a perspective view of a complete vehicle frame according to the principles of the present invention.

FIG. 3 shows a complete sub-frame assembly 2 comprising the rear stiff torque box 10 and a forward stiff torque box 110, several frame rail segments 12a, 12b, 12c, and a cross rail 22. The sub-frame assembly 2 can then be built into a complete vehicle frame assembly 3, such as shown in FIG. 4. The complete vehicle frame assembly 3 is built using a similar sub-frame assembly 2 as is shown in FIG. 3. Front and rear stiff torque boxes 110 are used to attach various frame rail segments 12a, 12b, 12c, as described above. The torque boxes 10, 110 are located on opposing ends of the complete vehicle frame 3. Several cross rails 22 are also introduced extending between middle frame rail segments 12b to aid in stiffening the complete vehicle frame 3. Various upper frame members 24 are connected to the sub-frame 2 to form the complete vehicle frame 3. Having used stiff torque boxes 10, 110 in its construction, the thus formed complete vehicle frame 3 allows for a very rigid and stiff frame, while providing savings on both cost and weight versus current production conventional construction aluminum or steel frame.

Figure 5:
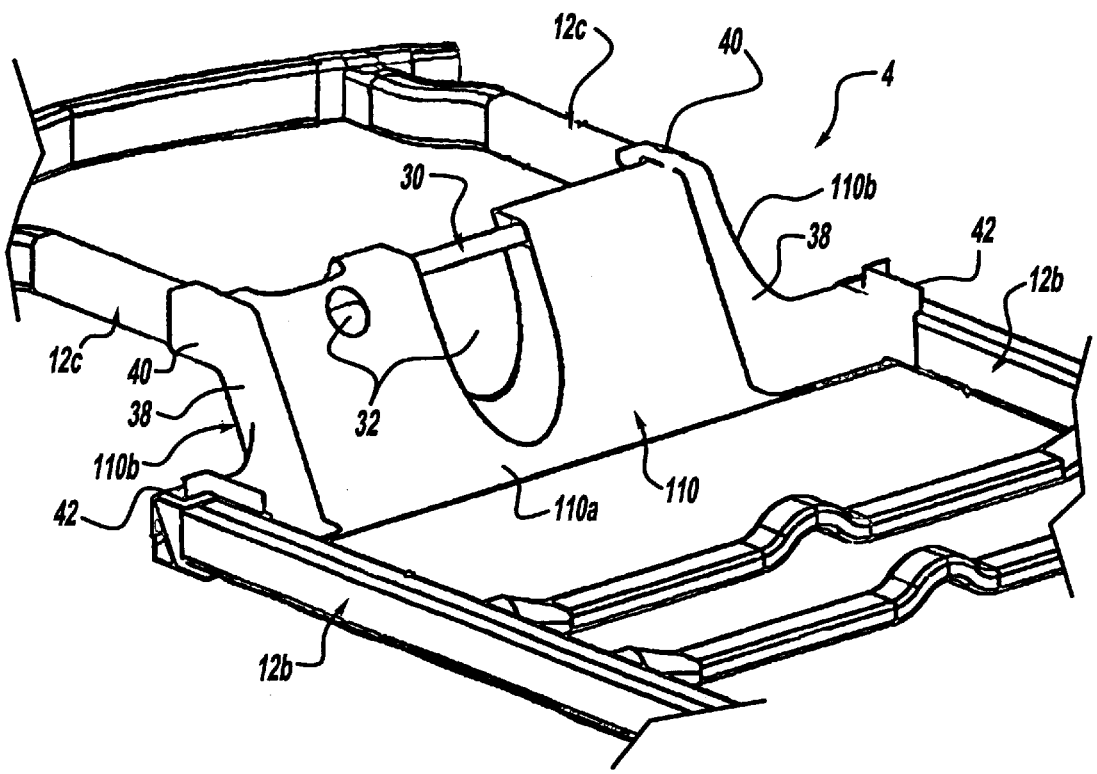
FIG. 5 is a perspective view of a reinforced front stiff torque box according to the principles of the present invention.
Figure 6:
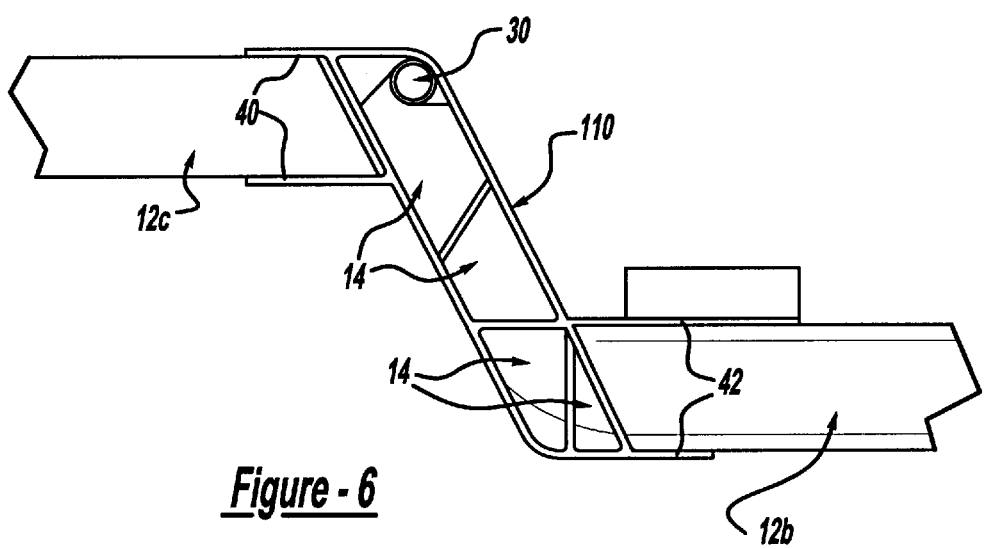
FIG. 6 is a side view of the reinforced front stiff torque box according to the principles of the present invention.

If added stiffness is required, a reinforcement tube can be introduced into either of the stiff torque boxes 10, 110, as is shown in FIG. 5. The stiff torque box 110 is constructed as described above. A reinforcement tube 30 is introduced into one of the internal cavities 14 defined by the stiff torque box. It should be noted that the reinforcement tube 30 is fixedly attached to the torque box 110 in the cavity 14 (as best shown in FIG. 6). The frame rails 12b and 12c are attached to the torque box 110 in the manner as will be described herein. FIG. 6 is a side view of the stiff torque box 110 as described with the reinforcement tube 30 connected to the torque box 110 by welding. The reinforcement tube 30 allows a cut-out portion 32 to be provided in the stiff torque box 110 in order to accommodate a steering column and other vehicle components without weakening the frame structure.

The front torque box 110 is also provided with a pair of end cap members 110b which are welded or otherwise fastened to the extruded portion 110a of the torque box 110. The end cap members 110b include a body portion 38 which covers the ends of the extruded body portion 110a of the torque box 110, upper connecting portions 40 which attach to the front frame rail segments 12c and lower connecting portions 42 which attach to the middle frame rail segments 12b. End caps could be applied to both front and rear torque boxes.

Various other advantages of the present invention will become apparent to those skilled in the art after having the benefit of studying the foregoing text and drawing taken in conjunction with the following claims.

What is claimed is:

1. A vehicle frame comprising:
    a torque box including a skeleton structure which defines a plurality of cavities, said torque box including a pair of upper connecting portions disposed at opposite ends of said torque box and a pair of lower connecting portions disposed at opposite ends of said torque box; and
    a pair of upper frame rail segments positioned within a common first plane and each connected to a respective upper connecting portion of said torque box; and
    a pair of lower frame rail segments positioned within a common second plane and each connected to a respective lower connecting portion of said torque box.

2. The vehicle frame according to claim 1, wherein said torque box further includes a pair of end cap members connected to said skeleton structure said end cap members forming said pair of upper connecting portions and said lower connecting portions.

3. The vehicle frame according to claim 1, wherein said torque box is disposed within a third plane which intersects said first and second planes at an angle.

4. The vehicle frame according to claim 3, wherein said first and second planes are generally parallel and vertically offset from one another.

5. The vehicle frame according to claim 1, further comprising a cross-member connected between said pair of lower frame rail segments.

6. The vehicle frame according to claim 1, further comprising a second torque box including an extruded aluminum skeleton which defines a plurality of cavities, said second torque box including a pair of lower connecting portions disposed at opposite ends of said second torque box and connected to said pair of lower frame rail segments, and a pair of upper connecting portions disposed at opposite ends of said second torque box; and
    a second pair of upper frame rail segments each connected to a respective one of said upper connecting portions of said second torque box.

7. The vehicle frame according to claim 1, wherein said torque box includes a cut-out portion and a reinforcement member fixed to said torque box and extending across said cut-out portion.

8. The vehicle frame according to claim 1, further comprising a reinforcement tube fixed to said torque box within one of said cavities.

9. The vehicle frame according to claim 1, wherein said upper connecting portions and said lower connecting portions include connecting tabs.

10. The vehicle frame according to claim 1, wherein said skeleton structure is made from extruded aluminum.

* * * * *